Nov. 6, 1962     R. E. O'BRIEN     3,061,999
DETACHABLE CHAIN LINKS HAVING CAMMING NOTCHES
Filed Jan. 20, 1960

Robert E. O'Brien
INVENTOR

United States Patent Office 3,061,999
Patented Nov. 6, 1962

3,061,999
DETACHABLE CHAIN LINKS HAVING CAMMING NOTCHES
Robert E. O'Brien, 24 Hoffman Court, Wallingford, Conn.
Filed Jan. 20, 1960, Ser. No. 3,687
1 Claim. (Cl. 59—90)

This invention relates to a chain link that has new and novel features which make it possible to quickly and easily create a chain of any desired length, and also when desired, to quickly and easily shorten the chain so made to any desired length or to completely disassemble the chain to its component links if so desired.

Notwithstanding the ease with which my link may be assembled into a chain, it will not come apart accidentally by reason of shaking or vibration of any sort and can be disassembled only by direct action and intention.

A chain composed of my links is of great desirablity for it can be assembled or disassembled manually without the use of or aid of any tools whatsoever. Another advantage of my link is that in relationship to the length of chain that can be assembled with any given number of links, the same number of unassembled links have a surprisingly small cubic volume or bulk. This is of great importance in packaging and merchandising.

Figure 1:
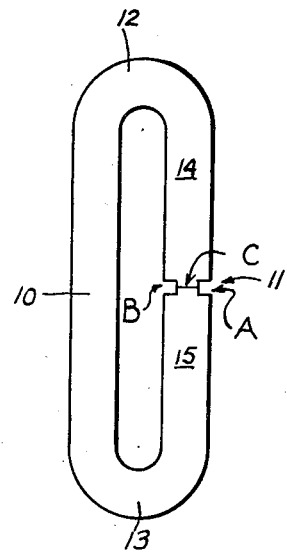
Figure 2:

FIG. 1 is a side elevation of the novel chain link.
FIG. 2 is an edge elevation of the link taken from the right side of FIG. 1.

The link is made of flat material and comprises a pair of elongated, generally parallel, side portions 10 and 11 joined at opposed ends by U-shaped return bend portions 12 and 13. As will be seen in the drawing, FIG. 1, the link has a notch on its exterior edge designated as A and a notch on its interior edge designated as B. The line C represents a through slot effective to divide the side portion 11 into two segments 14 and 15 which normally abut one another as is apparent in FIG. 1.

For the purpose of illustration, I have shown these notches as square or rectangular, but they may be other shapes such as curved, semicircular or V-shaped.

These notches will be of sufficient width to accept freely the edge of the link to be assembled or disassembled. To assemble it is only necessary to insert the edge of a link into notch A, turn it a quarter of a turn in either direction; this will cause the side of the link to spread apart laterally and thus permit the entrance of the link completely within the other link. Once this has been achieved, that side of the link thus operated upon will, because of the natural temper of its material, spring back into its original position, thus closing the opening and providing a linking of the links thus assembled which will not permit shaking apart or unintentional separation.

Conversely, to quickly and easily disassemble the links thus assembled it is only necessary to insert the interior edge of the link into the notch B and repeat the operation as described in the preceding paragraph except that the link to be disassembled be withdrawn.

I claim:
A pair of cooperating flat chain links each fabricated from a single layer of sheet material and each manually operable to engage and to disengage with respect to one another, each link comprising a pair of elongated, generally parallel, side portions joined at opposed ends by U-shaped return bend portions extending in the plane of said sheet material, a first side portion of each link being formed with a centrally disposed through-slot of a smaller width than the thickness of the sheet material and effective to divide said first side portion into two generally equal coplanar segments, said slot being generally disposed perpendicularly to the elongated side portions, said segments being substantially in abutment with one another at their end faces to form a substantially complete loop, the first side portion being further formed with an exterior and an interior notch, each notch extending through the plane of said segments, each notch joining an end of said slot and having a mouth of dimension longitudinally of said link greater than the thickness of said sheet material whereby a second side portion of a first one of said links is operative to engage the exterior notch in the second link so that upon rotation of the first link relative to the second link, the two segments of the second link are spread laterally a distance sufficient to permit the second side portion of the first link to pass within and join the second link, said first link being separable from the second link by corresponding engagement of the second side portion of the first link with the interior notch of the second link and with corresponding relative rotation of said links.

References Cited in the file of this patent

UNITED STATES PATENTS

| | | |
|---|---|---|
| 135,712 | Jenks | Feb. 11, 1873 |
| 295,158 | Fisher | Mar. 18, 1884 |
| 344,488 | McKenzie | June 29, 1886 |
| 345,407 | Besse | July 13, 1886 |
| 680,005 | Southworth | Aug. 6, 1901 |
| 1,110,873 | Boye | Sept. 15, 1914 |
| 1,412,919 | Campbell | Apr. 18, 1922 |
| 2,183,994 | Lindquist | Dec. 19, 1939 |
| 2,906,507 | Hodson | Sept. 29, 1959 |

FOREIGN PATENTS

| | | |
|---|---|---|
| 304,412 | Great Britain | Jan. 24, 1929 |
| 548,164 | Great Britain | Sept. 28, 1942 |